United States Patent [19]
Honda

[11] Patent Number: 6,032,236
[45] Date of Patent: Feb. 29, 2000

[54] DATA BACKUP SYSTEM IN TERMINAL DEVICE CONNECTED TO DATA COMMUNICATIONS NETWORK

[75] Inventor: Masahiko Honda, Tokyo, Japan

[73] Assignee: NEC Corporation, Tokyo, Japan

[*] Notice: This patent is subject to a terminal disclaimer.

[21] Appl. No.: 09/154,467

[22] Filed: Sep. 16, 1998

Related U.S. Application Data

[62] Division of application No. 08/766,960, Dec. 16, 1996.

[30] Foreign Application Priority Data

Dec. 18, 1995  [JP]  Japan ..................................... 7-328641

[51] Int. Cl.[7] ...................................................... G06F 11/00
[52] U.S. Cl. .................................. 711/162; 714/6; 714/47; 707/204
[58] Field of Search ....................................... 711/161, 162; 395/182.04, 182.03, 182.18, 182.21, 200.64, 651–653; 707/204; 370/498, 524, 359; 371/30; 714/2–5, 16, 18, 20, 47

[56] References Cited

U.S. PATENT DOCUMENTS

| | | | |
|---|---|---|---|
| 5,748,882 | 5/1998 | Huang | 714/47 |
| 5,838,894 | 11/1998 | Horst | 714/11 |

FOREIGN PATENT DOCUMENTS

| | | |
|---|---|---|
| 3-250835 | 11/1991 | Japan . |
| WO 95/22105 | 8/1995 | WIPO . |

*Primary Examiner*—John W. Cabeca
*Assistant Examiner*—Denise Tran
*Attorney, Agent, or Firm*—Foley & Lardner

[57] ABSTRACT

A data backup system in which, in a data communications network to which three or more terminal devices are connected, each terminal device connected to the data communications network includes a storage unit for storing individual information necessary for restarting its own terminal device and individual information necessary for restarting other terminal device, and individual information of other terminal device stored in the storage unit of each terminal device is individual information of still other terminal device than other terminal device which stores individual information of its own terminal device in the storage unit.

1 Claim, 3 Drawing Sheets

DATA BACKUP SYSTEM IN TERMINAL DEVICE CONNECTED TO DATA COMMUNICATIONS NETWORK

This application is a divisional of Ser. No. 08/766,960 filed Dec. 16, 1996.

BACKGROUND OF THE INVENTION

1. Field of the Invention

The present invention relates to a data backup system in a terminal device connected to a data communications network and, more particularly, to a data backup system for backing up individual information necessary for restarting each terminal device after recovery from its failure.

2. Description of the Related Art

In a data communications network, when a terminal device develops a fault, restoration of the fault is conducted by resetting the terminal device to initialize the same. In this case, data not retained in the terminal device at the time when the device is reset will be lost. Information necessary for the terminal device should be therefore obtained from another terminal device holding the lost data. Even if the failure occurring at a terminal device is a temporary failure such as failure resulted from runaway of a program caused by noise, or even if it is an easily recoverable failure, the same recovering procedure as that necessary for the above-described fatal failure is required. As a result, operation rate of the terminal device is lowered.

Concerning the above-described problem, for an easily recoverable failure occurring at a terminal device, there have been conventionally proposed various means for resetting the device and then automatically obtaining necessary information to recover from the failure. One of related art of this kind is recited, for example, in Japanese Patent-Laying Open (Kokai) No. Heisei 3-250835, entitled "Terminal Device".

According to the technique recited in the above literature, a terminal device connected to a center device via an ISDN line network includes, as shown in FIG. 3, a monitoring means 110 for detecting a failure occurring at each unit having an intelligent circuit such as a line interface unit, a line control unit and a device control unit, a resetting means 120 for resetting each of the above-mentioned units having an intelligent circuit when the monitoring means detects a failure, an initializing means 130 for initializing each unit which is reset, and a failure developing factor maintaining means 140 for maintaining a failure developing factor without being reset when the terminal device goes down. At each terminal device, when the monitoring means 110 detects a failure, the failure developing factor maintaining means 140 saves the failure developing factor and then the resetting means 120 resets every unit except the failure developing factor maintaining means 140. Then, after the self-diagnoses of a memory and an interface, each unit is initialized by the initializing means 130 to notify the center device of the maintained failure developing factor and boot the device.

According to the above-described conventional failure recovering technique, however, with a great failure, resetting the terminal device for the purpose of restoration results in erasing a failure developing factor maintained in the failure developing factor maintaining means 140, a parameter defining the operation state, various kinds of event information generated during the operation of the device and even variable information inherent to the terminal device. Restoration of the device to the state before resetting therefore needs labor and time, causing reduction in the operation rate of the system.

Another possible solution for efficiently obtaining necessary information at the time of restoration after resetting is to provide one master terminal device as a center device and concentratedly store information of all the terminal devices in a storage device provided in the master terminal device for the purpose of backing up data. This solution, however, has a drawback that it is impossible to back up the information of all the terminal devices when the master terminal device develops a fault.

SUMMARY OF THE INVENTION

A first object of the present invention is to provide a data backup system which can decrease the risk of losing backed up data and implement reliable backup.

A second object of the present invention is to provide a data backup system which can minimize loss when data including backed up data is lost due to a failure of a terminal device.

A third object of the present invention is to provide a data backup system which enables recognition of data backup relationship with ease for automatic and quick restarting after the recovery of a failure.

According to one aspect of the invention, a data backup system, in a data communications network to which three or more terminal devices are connected, for backing up individual information necessary for restarting after the recovery from a failure of a terminal device connected to the data communications network, wherein each of the terminal devices comprises:

- storage means for storing said individual information necessary for restarting its own terminal device and said individual information necessary for restarting other terminal device;
- reception means for receiving said individual information transferred from other predetermined terminal device and storing said individual information in said storage means;
- transfer means for transferring, at predetermined timing, said individual information of its own terminal device to other specific terminal device than the terminal device which has transferred said individual information; and
- access means for accessing, when the individual information stored in said storage means of its own terminal device is not available, said storage means of other terminal device to which the individual information of said its own terminal device is transferred so as to obtain the individual information of said its own terminal device.

In the preferred construction, each terminal device stores said individual information of other terminal device in said storage means in the order allocated for establishing a data backup relationship.

In the preferred construction, in a plurality of groups made up of an arbitrary number of, at least three, terminal devices among the terminal devices connected to said data communications network, said terminal devices each stores said individual information of other terminal device in said storage means in the order allocated for establishing a data backup relationship.

In another preferred construction, the terminal device further comprises non-volatile storage means for storing a first identification symbol applied to its own terminal device, a second identification symbol for identifying a terminal device as a backup object whose individual information is backed up in its own terminal device, and a third identification symbol for identifying a terminal device as a backup destination to and in which said individual information of its own terminal device is transferred and backed up, wherein the reception means, with reference to said non-volatile storage means, acknowledges that said individual information is transferred from a terminal device specified by said second identification symbol stored in said non-volatile storage means and receives said individual information, the transfer means, with reference to said non-volatile storage means, transfers the individual information of its own terminal device to a terminal device specified by said third identification symbol stored in said non-volatile storage means, and the access means, with reference to said non-volatile storage means, accesses said storage means of a terminal device specified by said third identification symbol stored in said non-volatile storage means.

In another preferred construction, the non-volatile storage means, in the order allocated for establishing a data backup relationship, stores an identification symbol applied to a terminal device immediately preceding its own terminal device as said second identification symbol and an identification symbol applied to a terminal device immediately succeeding to its own terminal device as said third identification symbol, when there exists no terminal device immediately preceding its own terminal device, stores an identification symbol applied to the last terminal device in said allocated order as said second identification symbol, and when there exists no terminal device immediately succeeding to its own terminal device, stores an identification symbol applied to the first terminal device in said allocated order as said third identification symbol.

Also, in a plurality of groups made up of an arbitrary number of, at least three, terminal devices connected to said data communications network and in the order allocated for establishing a data backup relationship, said non-volatile storage means stores an identification symbol applied to a terminal device immediately preceding its own terminal device as said second identification symbol and an identification symbol applied to a terminal device immediately succeeding to its own terminal device as said third identification symbol, when there exists no terminal device immediately preceding its own terminal device, stores an identification symbol applied to the last terminal device in said allocated order as said second identification symbol, and when there exists no terminal device immediately succeeding to its own terminal device, stores an identification symbol applied to the first terminal device in the allocated order as said third identification symbol.

According to another aspect of the invention, a data backup system, in a data communications network to which three or more terminal devices are connected, for backing up individual information necessary for restarting after the recovery from a failure of a terminal device connected to the data communications network, wherein each of the terminal devices connected to the data communications network having storage means for storing first individual information necessary for restarting its own terminal device and second individual information necessary for restarting other terminal device, and the second individual information of said other terminal device stored in said storage means of said its own terminal device is said second individual information of still other terminal device than said other terminal device which stores said first individual information of its own terminal device as said second individual information in said storage means.

In the above-mentioned construction, each terminal device stores said second individual information of other terminal device in said storage means in the order allocated for establishing a data backup relationship so as to form a loop backup relationship as a whole.

In the preferred construction, in a plurality of groups made up of an arbitrary number of, at least three, terminal devices among the terminal devices connected to said data communications network, said terminal devices each stores said second individual information of other terminal device in said storage means in the order allocated for establishing a data backup relationship so as to form a loop backup relationship in said groups.

Further objects, features and effects of the present invention will become more apparent from the following detailed description.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to more clearly describe the present invention.

Figure 1:
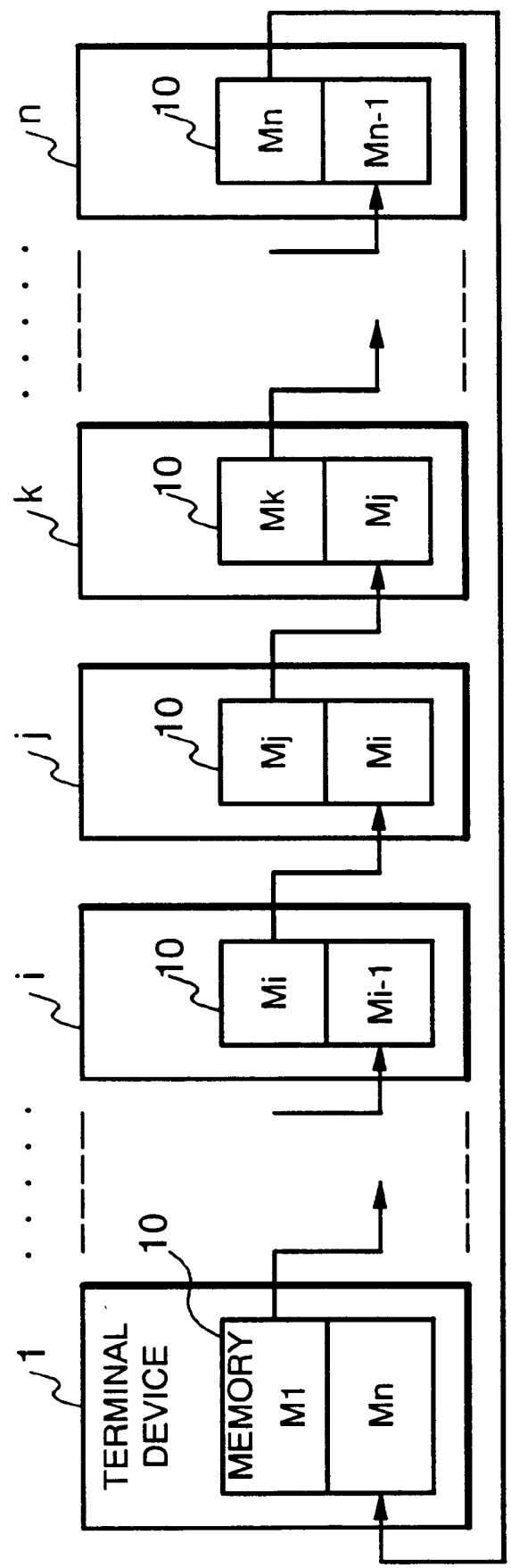
FIG. 1 is a block diagram showing a mode of a data backup system according to one embodiment of the present invention.

FIG. 1 is a block diagram showing a mode of a data backup system according to one embodiment of the present invention.

As illustrated in the figure, the respective terminal devices connected to a data communications network in the present embodiment are arranged in a loop to have a data backup relationship for backing up data in the allocated order. More specifically, in a data communications network in which n terminal devices are connected, backup relationship is maintained in series, that is, data of a first terminal device is backed up by a second terminal device, data of the second terminal device is backed up by a third terminal device and data of n-th terminal device is backed up by the first terminal device to form a loop structure.

Data to be backed up corresponds to individual information necessary for restarting each terminal device after the recovery of a fault, such as a parameter which defines an operation state and various kinds of event information generated during the operation. Hereinafter, the individual information is referred to as information "M" and is denoted with a serial number of a terminal device as necessary for the convenience of showing a loop structure. For example, individual information about the first terminal device is denoted as information "M1".

As shown in FIG. 1, assuming three terminal devices "i", "j" and "k" having a serial backup relationship, individual information "Mi" of the i-th terminal device is stored in a storage unit 10 of the i-th terminal device as well as in a storage unit 10 of the j-th terminal device for backup. In the same manner, individual information "Mj" of the j-th terminal device is stored in the storage unit 10 of the j-th terminal device as well as in a storage unit 10 of the k-th terminal device for backup. With this arrangement, when a failure occurs at the j-th terminal device, for example, even if the individual information "Mj" stored in the storage unit 10 of the j-th terminal device is not available at the time of restarting after the recovery from the failure, restarting is possible by accessing the individual information "Mj" backed up in the storage unit 10 of the k-th terminal device.

The data backup relationship among the respective terminal devices of the present embodiment, as illustrated in FIG. 1, is circularly defined to have a loop structure such that a terminal device as a backup object whose data is to be backed up and a terminal device as a backup destination at which data of its own terminal device is to be backed up are not overlapped with each other. Loop structure of the backup relationship may be a large loop formed of all the terminal devices connected to a data communications network or a plurality of small loops each formed of an appropriate number, not less than three, of terminal devices. In the latter case, a plurality of groups of terminal devices having a backup relationship of the loop structure will exist for the data communications network. Since the loop structure of each backup relationship is closed to each other and such a relationship is maintained in each group forming the loop of the backup relationship that a terminal device as a backup object and a terminal device as a backup destination of the data of its own terminal device do not overlap with each other, the plurality of the groups function in the same manner as one large loop as a whole.

With locally separated small-sized terminal devices, one terminal device at a branch of a loop may be responsible for backup of two or three terminal devices. In this case, however, a failure occurring at a terminal device responsible for backup may lead to loss of individual information of a terminal device whose data is backed up. It is therefore desirable that responsibility of backup is decentralized to each terminal device in a loop formed with the backup relationship.

Figure 2:
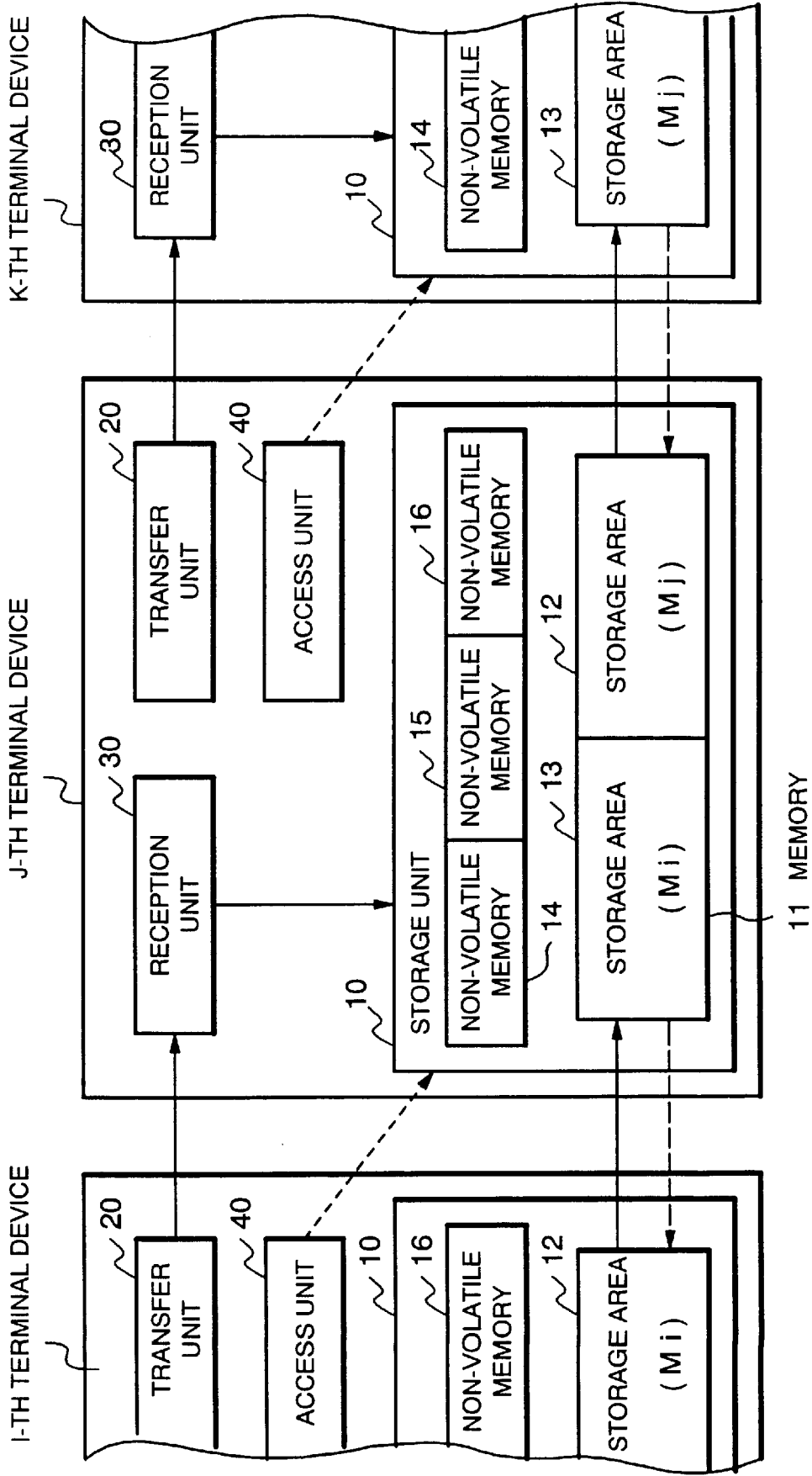
FIG. 2 is a block diagram showing configuration of terminal devices implementing the data backup system according to one embodiment of the present invention.
Figure 3:
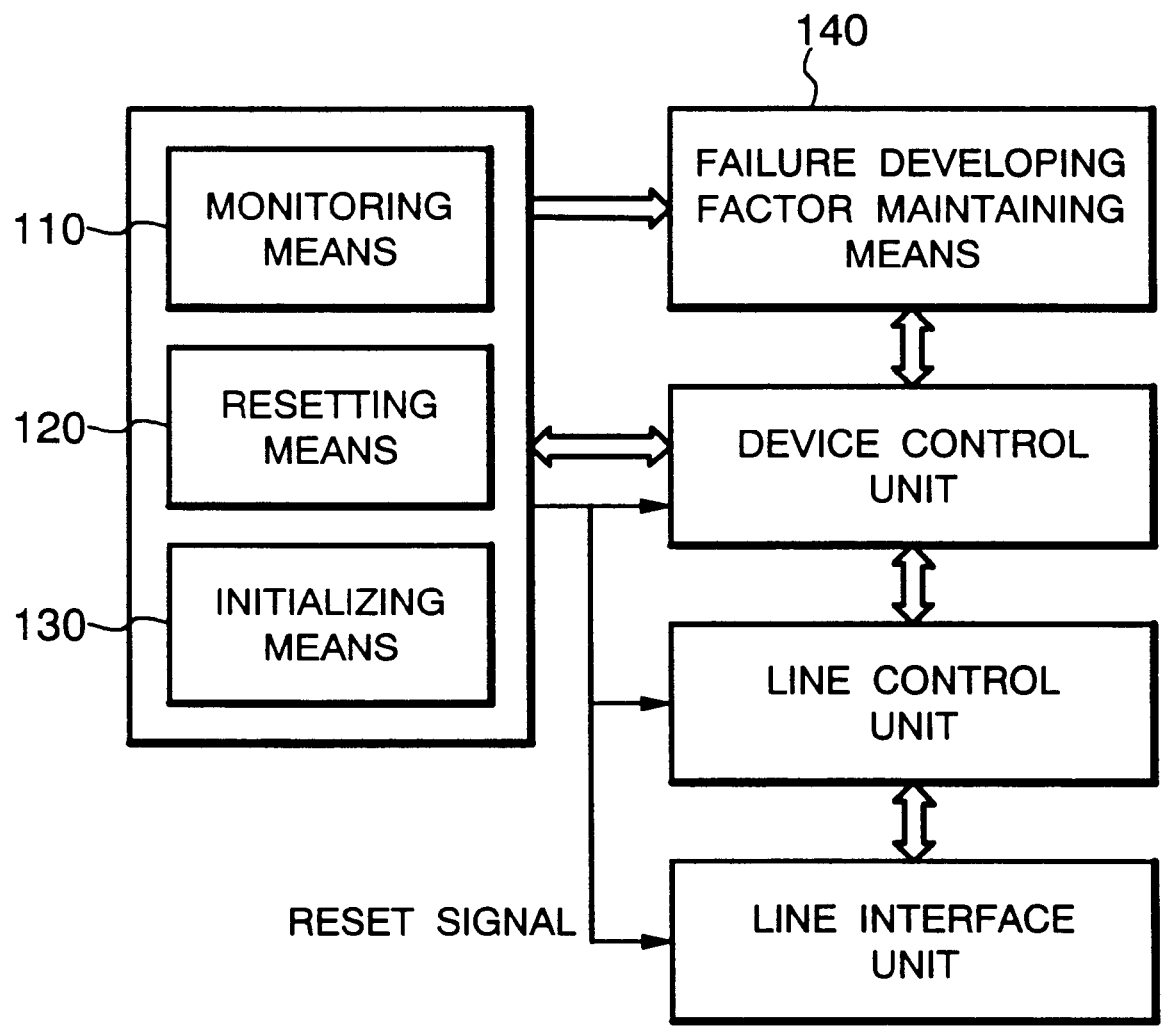
FIG. 3 is a block diagram showing an example of configuration of a conventional terminal device.

FIG. 2 is a block diagram showing configuration of terminal devices implementing the data backup system shown in FIG. 1.

As illustrated in the figure, the first to n-th terminal devices shown in FIG. 1 each includes a storage unit 10 for storing individual information "M" and information about a terminal device as a backup destination, a transfer unit 20 for transferring the individual information "M", of its own to a terminal device as a backup destination, a reception unit 30 for receiving individual information of another terminal device transferred therefrom, and an access unit 40 for accessing backed up data after the restoration of a fault. Illustrated in FIG. 2 is only the characteristic part of the configuration of the present embodiment and illustration of the remaining common part is omitted. It is apparent that the device in practice includes a data processing unit for conducting various kinds of processing, an input unit for receiving input of data and instructions and an output unit for outputting and displaying data.

In the following, detailed description will be given of each component with respect to the j-th terminal device as an example, that is, in a case where the j-th terminal device backs up individual information "Mi" of the i-th terminal device and individual information "Mj" of its own device is backed up by the k-th terminal device.

The storage unit 10 includes a reloadable memory 11 for storing individual information "M" for use in restarting a terminal device after the recovery from a fault, and non-volatile memories 14, 15 and 16 for storing identification symbols of a terminal device. The memory 11 includes a storage area 12 for storing individual information "Mj" of the j-th terminal device itself and a storage area 13 for storing individual information "Mi" of the i-th terminal device as a backup object. The non-volatile memory 14 stores an identification symbol applied to the j-th terminal device. The non-volatile memory 15 stores an identification symbol of the i-th terminal device as a backup object. The non-volatile memory 16 stores an identification symbol of the k-th terminal device which backs up the individual information "Mj" of the j-th terminal device.

The transfer unit 20, which is implemented by a program-controlled CPU and an interface connected to the data communications network, periodically transfers the same individual information "Mj" as the individual information "Mj" stored in the storage area 12 in the memory 11 of its own terminal device to the k-th terminal device as a backup destination.

The reception unit 30, which is implemented by a program-controlled CPU and an interface connected to the data communications network, accepts the individual information "Mi" transferred from the i-th terminal device as a backup object and stores the information in the storage area 13 in the memory 11.

The access unit 40, which is implemented by a program-controlled CPU, when the individual information "Mj" of the j-th terminal device stored in the storage area 12 in the memory 11 is not available due to a failure of its own terminal device at the time of restoration after the occurrence of the failure, accesses the storage area 13 in the memory 11 of the k-th terminal device which backs up the individual information "Mj" to obtain the information.

Next, operation of the present embodiment will be described with respect to the j-th terminal device as an example.

The j-th terminal device repeats the following operation in the normal state.

In the j-th terminal device, such individual information "Mj" varying with each device as a parameter which defines an operation state of its own device and various event information generated during the operation is accumulated in the storage area 12 provided in the memory 11 of the storage device 10. The transfer unit 20 of the j-th terminal device periodically reads the individual information "Mj" stored in the storage area 12 of the memory 11 and transfers the read individual information "Mj" to the k-th terminal device with reference to an identification symbol written in the non-volatile memory 16. The reception unit 30 of the j-th terminal device accepts the individual information "Mi" transferred from the i-th terminal device specified by the identification symbol in the non-volatile memory 15 and stores the information in the storage area 13 in the memory 11 of the j-th terminal device.

As a result of the repetition of the foregoing operation by each terminal device, individual information "Mm (m:

$1 \leq m \leq n$)" of each terminal device is stored in the storage area 12 in the memory 11 of its own terminal device and individual information "Mm−1" of other terminal device as a backup object is stored in the storage area 13. Each individual information "M" of the first to n-th terminal devices is therefore stored in duplicate in the storage area 12 in the memory 11 of its own terminal device and in the storage area 14 in the memory 11 of other terminal device.

When, in this state, any of the terminal devices is reset and the individual information "M" of the terminal device stored in the storage area 12 of the storage unit 10 is erased, the access unit 40, with reference to the non-volatile memory 16, accesses the memory 11 of a terminal device specified by a stored identification symbol to obtain individual information "M" stored in the storage area 14 and restores the information to the storage area 12 in the memory 11 of its own terminal device.

As described in the foregoing, since according to the data backup system of the present invention, a circular data backup relationship among three or more terminal devices arranged in a loop prevents backed up data of individual information of a plurality of terminal devices from centering on one terminal device, backup will be impossible only when two successive terminal devices develop failures at the same time. As a result, the risk of losing duplicate individual information can be decentralized.

Furthermore, even if individual information of a predetermined terminal device is lost, only the two successive terminal devices which develop failures at the same time suffer damage, so that damage can be locally limited.

In addition, since identification symbols of a terminal device as a backup object whose data is backed up in its own terminal device and a terminal device as a backup destination which backs up the data of its own terminal device are stored and maintained in non-volatile memories, data backup relationship can be recognized with ease at the time of restoration of a fault, enabling restarting after the recovery from the fault to be automatically and quickly executed.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. A data backup system, in a data communications network to which three or more terminal devices are connected, for backing up individual information necessary for restarting after the recovery from a failure of a terminal device connected to the data communications network, wherein each of the terminal devices connected to the data communications network having a storage unit configured to store first individual information necessary for restarting its own terminal device and second individual information necessary for restarting a first communicatively adjacent terminal device; and wherein a second communicatively adjacent terminal device stores, as backup information for restarting said its own terminal device, said first individual information of said its own terminal device as said second individual information in said storage unit of said second communicatively adjacent terminal device, and said backup information is periodically transferred between adjacent ones of said terminal devices, wherein each of said storage units in said each of said terminal devices comprises:

a first non-volatile memory region for storing an identification symbol of said corresponding terminal device;

a second non-volatile memory region for storing an identification symbol of said first communicatively adjacent terminal device;

a third non-volatile memory region for storing an identification symbol of said second communicatively adjacent terminal device; and a reloadable memory for storing said first individual information and said second individual information.

\* \* \* \* \*